United States Patent
Souriau

(10) Patent No.: US 7,349,603 B2
(45) Date of Patent: Mar. 25, 2008

(54) OPTICAL ARRANGEMENT WITH TWO OPTICAL INPUTS/OUTPUTS AND PRODUCTION METHODS

(75) Inventor: Jean-Charles Souriau, Saint-Egreve (FR)

(73) Assignee: Commissariat A l'Energie Atomique, Paris (FR)

( * ) Notice: Subject to any disclaimer, the term of this patent is extended or adjusted under 35 U.S.C. 154(b) by 0 days.

(21) Appl. No.: 10/731,382

(22) Filed: Dec. 8, 2003

(65) Prior Publication Data

US 2004/0161201 A1 Aug. 19, 2004

(30) Foreign Application Priority Data

Dec. 9, 2002 (FR) .................................. 02 15549

(51) Int. Cl.
- G02B 6/26 (2006.01)
- G02B 6/42 (2006.01)
- H01L 31/0232 (2006.01)
- H01L 31/0203 (2006.01)
- H01L 31/00 (2006.01)
- H01L 21/00 (2006.01)

(52) U.S. Cl. ............................. 385/52; 385/50; 385/51; 385/8; 385/9; 385/14; 257/432; 257/433; 257/451; 257/21; 257/184; 438/108

(58) Field of Classification Search .................... 385/1, 385/14, 52
See application file for complete search history.

(56) References Cited

U.S. PATENT DOCUMENTS 5,247,597 A * 9/1993 Blacha et al. .................. 385/88

5,349,500 A * 9/1994 Casson et al. .............. 361/749
6,151,173 A 11/2000 Massit et al.

(Continued)

FOREIGN PATENT DOCUMENTS

DE 19643911 A1 5/1998

(Continued)

OTHER PUBLICATIONS

Souriau et al., "Passive Fibre Alignment on Optoelectronic Components for Electro-Optical Links Based on Single-Chip Technology and VCSELs", 2001, IMAPS Strausbourg, p. 3.*

(Continued)

Primary Examiner—Frank G. Font
Assistant Examiner—Erin D Chiem
(74) Attorney, Agent, or Firm—Brinks Hofer Gilson & Lione

(57) ABSTRACT

Optical arrangement comprising two parallel plates each with a through-hole forming an optical input/output with a given optical axis and one at least partly optical component placed between the plates, the component and the first plate comprising first fastening studs placed transversely in opposite relationship of the plate and connected by first bumps made of a meltable material that when molten is able to selectively wet these first fastening studs in order to optically align the component and the input/output on the first plate, and the two plates comprising second fastening studs placed transversely in opposite relationship of the plate and connected by second bumps made of a meltable material that when molten is able to selectively wet the second fastening studs in order to optically align the inputs/outputs of the two plates.

11 Claims, 1 Drawing Sheet

U.S. PATENT DOCUMENTS

| | | | |
|---|---|---|---|
| 6,243,508 B1* | 6/2001 | Jewell et al. | 385/14 |
| 6,624,444 B1* | 9/2003 | Li | 257/59 |
| 6,650,817 B2* | 11/2003 | Murali | 385/131 |
| 2003/0183893 A1* | 10/2003 | Li | 257/432 |
| 2004/0023437 A1* | 2/2004 | Moon et al. | 438/108 |
| 2005/0026476 A1* | 2/2005 | Mok et al. | 439/81 |

FOREIGN PATENT DOCUMENTS

| | | |
|---|---|---|
| DE | 19810060 A1 | 11/1998 |
| EP | 1061392 A1 | 12/2000 |

OTHER PUBLICATIONS

Holm et al., "Through-Etched Silicon Carriers for Passive Alignment of Optical Fibers to Surface-Active Optoelectronic Components," *Sensors and Actuators*, 82 (2000) 245-248.

* cited by examiner

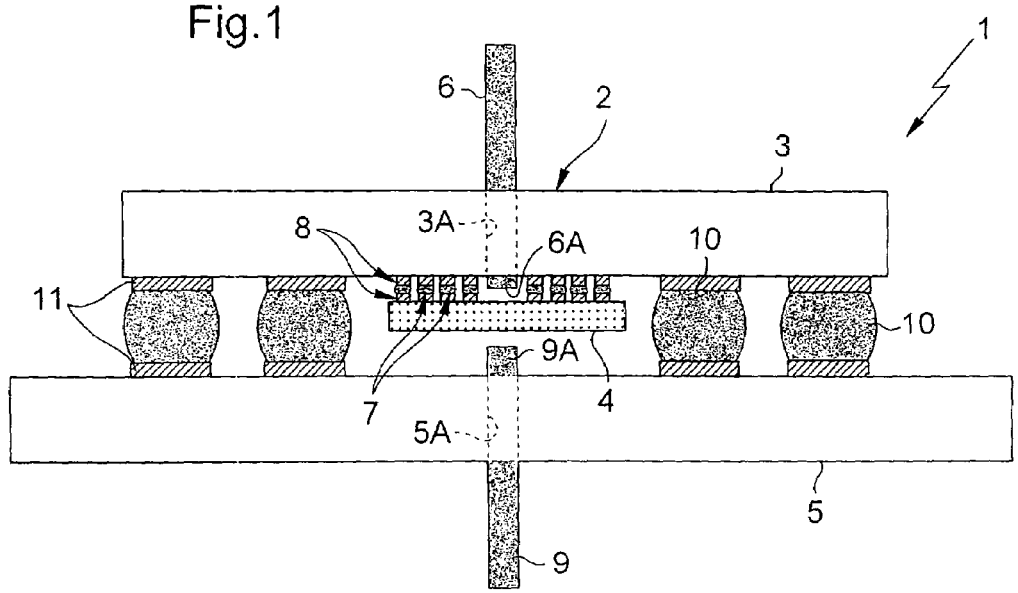
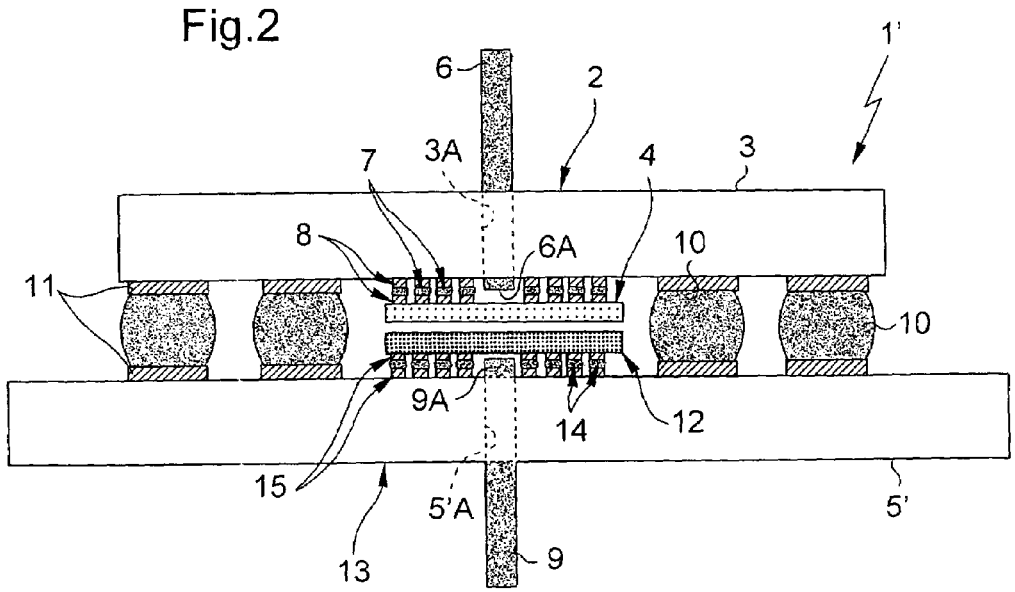

OPTICAL ARRANGEMENT WITH TWO OPTICAL INPUTS/OUTPUTS AND PRODUCTION METHODS

This application claims priority to French Patent Application No. 0215549 filed Dec. 9, 2002.

TECHNICAL FIELD

The invention relates in general, in the field of micro-technology (or even nanotechnology), to the integration of at least partly optical components into an optical link, and applies more specifically to an optical arrangement comprising at least one optical component between two optical inputs/outputs such as waveguides (typically fibres) that must satisfy an optical alignment condition.

It is particularly applicable to the fields of optical filtering and optical pumping.

BACKGROUND

As is known, in the field of microelectronics, the increase in the operating frequency of electronic systems has led to signal flows being provided in optical form by means of optical waveguides, which also have the advantage of providing high levels of immunity to electromagnetic interference.

This has led to the appearance of optoelectronic microsystems that can combine optical components, optoelectronic components (with either optical or electrical input or output signals) and electronic components (integrated circuits).

The overall optical alignment of the components is a critical stage in the assembly of this type of optoelectronic microsystem, and one of the major problems is that such overall alignment depends on a succession of two-by-two alignments between the successive optical and opto-electronics components of such a system. The optical alignment criterion for a system therefore depends both on the accuracy required for each two-by-two alignment and the number of components to be optically aligned.

Currently, microsystem alignment techniques can be divided into three major categories:

1—active alignment, for which light must be injected at the end of one fibre and the components positioned one-by-one in such a way that there is as strong a signal as possible at the end of the other fibre; optimization is carried out by small movements of the components to be aligned transverse to the optical path, which requires mechanical or piezoelectric micromanipulators. The positions defined in this way are then fixed by bonding. This type of active alignment procedure takes a very long time and requires mechanical fixing means the use of which does not generate stresses that might alter the final alignment (and which, of course, do not damage the components and in particular the fibres).

2—optical alignment using aiming sights which require highly sophisticated positioning equipment.

3—alignment using positioning blocks or stops made in the microsystem support; however, it is difficult to make blocks or stops on optical components.

A new method of passive alignment is beginning to emerge and is in particular described in document FR-2 757 276 (EP-0 944 851 or U.S. Pat. No. 6,151,173) relating to an assembly of optically aligned optical components and a method of producing it. To align two components mounted on the same substrate that must be aligned parallel to the surface of the substrate, the document teaches the use of micro-pellets made of a meltable material connecting positioning studs placed respectively on the surface of the substrate and each of the components. When the material melts between two facing studs, the surface tension forces of the material and the wettability of the material on the studs bring about the self-alignment of the components on the substrate holding them (the substrate is known as the interconnection substrate). Sub-micron accuracy is obtained.

This possibility of passive alignment has also been applied in Holm, Ahlfeldt, Svensson and Vieider's document "Through-etched silicon carriers for passive alignment of optical fibers to surface-active optoelectronic components" published in Sensors and Actuators 82 (2000) pp. 245-248, and in Souriau, Cobbe, Delatouche and Massit's "Passive Fibre Alignment on Optoelectronic Components for Electro-Optical Links Based on Single-Chip Technology and VCSELs" paper given at the 2001 Strasbourg IMAPS Conference. Here, the properties of self-alignment using micro-pellets are used to align an optical fibre and an optoelectronic component. In the first document, the fibre is engaged in a hole made in the substrate on which the component is self-aligned, whilst in the second document the fibre is engaged in a plate that is mounted on the substrate independently of the component.

What the above examples of passive alignment have in common is that they only propose the alignment of two components with each other, and the two aforementioned articles, which are the only ones to envisage mounting components perpendicular to a substrate, are limited to the alignment of two components (fibre+component) as they are limited to optoelectronic components solely carrying out an optical/electronic conversion or vice versa.

However, a new need has emerged to couple three optical components with very good optical alignment, namely two optical fibres (more generally two optical inputs/outputs) between which at least one at least partly optical component is interposed, within a small and reasonably priced optical arrangement which is easy to produce.

SUMMARY

To this end, the invention provides an optical arrangement comprising two parallel plates each with a through-hole forming an optical input/output with a given optical axis and an at least partly optical component placed between the plates, the component and a first of these plates comprising first fastening studs placed transversely opposite the plate and connected by first bumps made of a meltable material that when molten is able to selectively wet these first fastening studs in order to optically align the component and the input/output on the first plate, and the two plates comprising second fastening studs placed transversely opposite the plate and connected by second bumps made of a meltable material that when molten is able selectively to wet the second fastening studs in order to optically align the inputs/outputs of the two plates.

It may be noted that, contrary to the usual way of the person skilled in the art, there is no step-by-step alignment as the two plates are directly aligned with each other independently of the component(s) that is (are) interposed between them.

In this document, the notion of an at least partly optical component must be understood to cover both purely optical components (such as lenses) and optoelectronic components (such as filters or laser cavities) through which a light signal can pass (however, the input and output flows are not necessarily identical).

According to preferred embodiments, which may be combined:

this arrangement comprises a second at least partly optical component placed between the first component and the second plate, the second component and one of the plates having third fastening studs placed transversely opposite the plate and connected by third bumps made of a meltable material that when molten is able to selectively wet the third fastening studs in order to optically align the second component and the input/output of the plate to which it is fixed by the third bumps, the second component is fixed to the second plate by the third bumps, each meltable material is chosen from a group comprising indium, tin-lead, indium-lead, silver-tin, antimony-tin and tin-silver-copper alloys, all of the bumps are made of the same meltable material, the fastening studs are made of a material chosen from a group comprising copper, nickel, silver and gold, all of the fastening studs are made of the same material, the first plate and the component each have an electrical interconnection network, the first fastening studs are metal and connected to a respective one of the networks, the meltable material being an electric conductor, at least one at least partly optical component is an optical filter, a variable optical attenuator, an electro-optic modulator, a wavelength-selective photodetector, an optically pumpable laser cavity or a micro-lens, the first component is mounted between 10 microns and 100 microns away from the first plate, the plates are made of silicon it also has a fibre engaged in at least one of the holes that form the inputs/outputs, as a variant, at least one of the holes that form the inputs/outputs is filled with a material transparent to light signals.

It can be seen that such an arrangement is easy to produce given the passive self-alignment provided by the bumps when they are molten, and on a small scale (unless there are reasons for making one of the plates bigger).

To produce such an arrangement, the invention provides a method according to which:

a hole designed to form an optical input/output is made in each of two plates, first fastening studs are formed on the first plate and the component and are adapted to be selectively wetted by a meltable material whilst the area around the studs is much less wettable by the material, the first fastening studs being placed so that they can come into opposite relationship transversely of the plate, second fastening studs are formed on the first and second plates and are adapted to be selectively wetted by a meltable material whilst the area around the studs is much less wettable by the material, the second fastening studs being placed so that they can come into opposite relationship transversely of the plates, disks made of the meltable material that can selectively wet the first fastening studs are placed between them and are temporarily melted in order to passively align the component and the hole in the first plate, disks made of the meltable material that can selectively wet the second fastening studs are placed between them and are temporarily melted in order to passively align the holes in the plates.

According to preferred embodiments of the invention, which may be advantageously combined:

third fastening studs are formed on one of the plates and a second component and are adapted to be selectively wetted by a meltable material whilst the area around the third studs is much less wettable by the material, the third studs being placed so that they can come into opposite relationship transversely of the plate and, before the two plates are aligned with each other, disks made of the meltable material that can selectively wet the third fastening studs are placed between them and temporarily melted in order to passively align the second component and the hole in the plate, the third fastening studs are formed on the component and the second plate, the disks are made of the same material, the fastening studs are made of the same material.

BRIEF DESCRIPTION OF THE DRAWING

FIG. 1 is a schematic view of a first optical arrangement according to the invention, and FIG. 2 is a schematic view of a second optical arrangement according to the invention, made up of two modules mounted facing each other.

DETAILED DESCRIPTION

The following description of the invention, given as a non-limitative illustrative example, gives objects, characteristics and advantages of the invention with reference to the appended drawings.

FIGS. 1 and 2 have the common feature that they show an assembly configuration in which two fibres and one or two at least partly optical components are aligned by means of two plates each having a through-hole receiving the end of one of the fibres, in which the component(s) are hybridized under the holes, and in which the assembly and hybridization of the components is carried out using meltable micropellets allowing for self-alignment. A configuration is thus obtained in which the fibres and the component(s) are correctly aligned with each other.

More specifically, FIG. 1 shows an optical arrangement 1 comprising a module 2 comprising a plate 3 and an optical component 4, and a second plate 5.

The plate 3 in the module 2 has a through-hole 3A, designed to receive, from a given side of the plate (from the top here), one end 6A of a fibre 6. The fibre has a known cross-section and is designed to pass through the plate and to be optically coupled with the component 4. The hole forms an optical input/output with a given axis defined here by the axis of the fibre. As shown in FIG. 1, the end of the fibre extends beyond the through-hole.

Component 4 in the module is hybridized (i.e. fixed directly to) under the hole in the plate 3, i.e. on the opposite side of the plate from the side from which the fibre enters the hole, and away from the side.

The hybridization is achieved using micro-pellets 7 (given their shape, they can probably more generally be called "bumps") connecting fastening studs 8 respectively made under the plate 3 and on the facing surface of the component 4, as is in particular described in the aforementioned document FR-2 757 276. These fastening studs are zones that can be wetted by the material forming the micro-pellets 7. The studs are in opposite relationship transversely of the plate and advantageously have the same cross-section on the plate and on the component (as a variant there may be differences, the important thing being that jointly with the micro-pellets, the various studs provide correct alignment). In this way, depending on the positioning of the studs on the plate and the component, the hole (and therefore the fibre engaged in it) and the component are self-aligned. The alignment accuracy of the input/output and the component is determined by the accuracy of the methods used to produce the fastening studs and the hole. Preferably, lithography methods are used to define the studs on any one surface, which allows for micron accuracy to be obtained.

A single fibre is shown, but there may of course be a set of fibres accurately positioned relative to each other, for example in a fibre ribbon.

Here, the fibre is engaged in the hole, but in a variant not shown, the fibre may be held away from the plate by any appropriate known means.

According to a further variant, the hole is not designed to receive a fibre and is filled with a material transparent to the optical signal in question, the hole itself defining an input/output cooperating with some other optical or optoelectronic component outside the arrangement.

The other plate 5, located opposite the first plate relative to the component, also has a through-hole 5A that forms an optical input/output and is designed to receive, from the opposite side of the second plate to the module, one end 9A of a second fibre 9 with a known cross-section.

In the example shown in FIG. 1, the end 9A is optically coupled with the component 4 in the module 2.

The two plates 3 and 5 are attached to each other by micro-pellets 10 (more generally known as "bumps") that connect fastening studs 11 placed facing each other on the two plates. This results in the self-alignment of the plates.

In the configuration shown, the fibres run on from one another, but it must be understood that they may be offset depending on the nature of the component in question. In other words, the notion of alignment of the inputs/outputs does not imply that their axes are the same, and only means that the axes are in a highly accurate configuration.

The holes 3A and 5A are made perpendicular to the surfaces of the plates in question, but they may be slanted with great care as necessary.

It can be seen that here the two plates are identical.

The component may be a purely optical component. However, when the component is an optoelectronic component (i.e. it has a partly electrical input/output, for example for its control), one of the plates may have an electrical interconnection network to connect the optical component to a board for example; to this end, the meltable material that the micro-pellets are made of and the material that the studs are made of are electric conductors so that the micro-pellets and the studs act as connection points.

As an example, the two plates are made of silicon. As a variant they can also be made of any other material, in particular a semi-conductor, which can be handled with microelectronic equipment, in particular AsGa, InP, Ge or glass, that are not wettable with a meltable material that the bumps may be made of.

The wettable zones forming the fastening studs are preferably defined by conventional microelectronics methods. The nature of the zones is chosen depending on the type of substrate that the plates are made of and the meltable material chosen. The size of these zones is defined depending on the material that the micro-pellets are made of and the required final hybridization height.

As an example, these zones may be made of copper, nickel, silver or gold, in particular, and they are typically around ten to several tens of microns high. In terms of cross-section, the lower the hybridization height, the smaller the zone, that is, in particular, the studs 8 are significantly smaller than the studs 11. These zones are known as wettable in that they have greater wettability vis-à-vis the meltable material that the bumps or micro-pellets are made of than the surrounding area of the substrate that the plate or component is made of.

The through-holes are advantageously positioned after the wettable zones have been produced, as accurately as possible. A particularly suitable method is RIE (Reactive Ion Etching) through a resin mask. This allows for micron accuracy to be achieved.

The width of the holes is designed to fit the diameter of the fibres, with just enough play to insert them (typically around 0.125 mm to 1 mm) and the holes can be the same shape as the fibres, i.e. circular, but they can also be polygonal, square or even triangular if the user wishes to reduce the number of points of contact between the fibre and the plate.

The micro-pellets 7 between the component and the plate to which it is attached are advantageously formed on the component before it is hybridized. During melting of the micro-pellets, the surface tensions automatically align the component relative to the wettable zones on the plate 3 and therefore relative to the plate.

The micro-pellets are, for example, made of an Sn/Pb, In/Pb, Ag/Sn, Sb/Sn or Sn/Ag/Cu alloy and they are typically around 10 to 100 microns high.

In practice, sub-micron accuracy is achieved.

After the module has been produced, the plates 3 and 5 are also assembled by micro-pellets in order to obtain self-alignment of the wettable zones between which the micro-pellets are melted, due to the surface tensions that occur.

The micro-pellets 10, which are larger than the micro-pellets 7, may be made of the same material or a different material; they are typically around 100 microns to 500 mm high, depending on the height of the micro-pellets 7 and the thickness of the component. Here again, sub-micron accuracy is achieved.

The fibres 6 and 9 are finally engaged in the holes in the assembly obtained, until their ends are in their respective desired configurations.

Using micro-pellets allows for self-alignment, which significantly reduces the assembly cost of the module and of the overall arrangement in FIG. 1. When the two plates, preferably together with the component substrate, are made of the same material, it is interesting to note that the alignment obtained is hardly affected by temperature variations as the fibres are both held in materials of the same type that therefore have the same thermal expansion coefficient.

FIG. 2 shows another arrangement according to the invention, which differs from the arrangement in FIG. 1 in that there is a second component 12 between the ends of the fibres.

In this figure, analogous components to those in FIG. 1 have the same reference number but with the prime suffix.

Thus, the arrangement 1' in FIG. 2 comprises a module 2 comprising a plate 3 with a through-hole, a component 4 and a plate 5' with a through-hole. Fibres 6 and 9 are also engaged in the through-holes in the plates.

FIGS. 1 and 2 differ from each other in that the desired configuration of the end 9A of the second fibre is such that it is optically coupled with the second component 12, which is in turn optically coupled to the component 4 in the module 2.

The arrangement in FIG. 2 can also be analysed as being the assembly of two modules 2 and 13 produced in advance, the module 13 being made up of the plate 5' and the component 12, which is attached to it by means of micro-pellets or bumps 14 connecting fastening studs 15 placed opposite each other on the facing surfaces of the second plate and the second component 12.

As an example, the component (or components) may in particular be:

an optical filter such as a Fabry-Perot micro-interferometer; in this case, the component selects part of the optical signal arriving through an input/output and lets the other part pass into the other input/output; this may apply when several signals are carried in the same fibre at different wavelengths; the component may be connected electrically to an interconnection network on the plate for activation purposes, a Variable Optical Attenuator (VOA), i.e. a component that attenuates the optical signal that arrives through one input/output and leaves through the other input/output; here again, the component may be connected to the interconnection network of the plate, a magneto-optical isolator, a micro-mirror, an electro-optic modulator, i.e. a component that modulates the incident optical signal (and is possibly connected to the interconnection network for its control), a network of micro-lenses, the first of which for example defocuses the light signal whilst the second refocuses it, a wavelength-selective photodetector (or a linear array of photodetectors), i.e. a component that only selects part of the signal (letting the rest through), which may be applicable when several signals are carried by the same fibre at different wavelengths; the part converted into an electrical signal may be applied to the interconnection network, an optically pumpable solid-state or semi-conductor laser cavity or linear array of laser cavities (the pumping is for example carried out by the first input/output whilst the laser beam is injected by the second input/output).

Of course, the processing that the components apply to the signal may be the other way round in that it could involve, for example, rather than removing part of the incident signal, adding to the signal.

As mentioned above, the fibres (and more generally the inputs/outputs) may not be collinear, and one of the components may for example induce a lateral shift of the signal or be equipped with a microguide that shifts the signal between the two components.

The second optical component may also simply form a stop for the end of the second fibre.

As mentioned above, a single fibre is shown in each plate, but the invention can be extended to a network of fibres, for example a linear network such as a ribbon; a hole calibrated for each fibre must simply be provided.

The invention claimed is:

1. An optical arrangement comprising:
   two parallel plates each having a through-hole defining an optical input/output defining an optical axis;
   an at least partly optical component between the plates,
      the at least partly optical component and a first plate of the two parallel plates comprising first fastening studs positioned transversely opposite on the first plate and on the at least partly optical component and connected by first bumps comprising a meltable material that when molten are configured to selectively wet the first fastening studs to optically align the at least partly optical component and the optical input/output of the first plate,
   wherein the two parallel plates further comprise second fastening studs positioned transversely opposite on the two parallel plates and connected by second bumps comprising a meltable material, and
   wherein the second fastening studs are distinct from the first fastening studs and are configured to limit lateral movement of the second bumps, such that when molten, the second bumps selectively wet the second fastening studs to optically align the optical input/output in each of the two parallel plates.

2. The optical arrangement according to claim 1, wherein each meltable material is selected from a group comprising indium, tin-lead, indium-lead, silver-tin, antimony-tin and tin-silver-copper alloys.

3. The optical arrangement according to claim 1, wherein the first and second bumps comprise the same meltable material.

4. The optical arrangement according to claim 1, wherein the first and second fastening studs comprise a material selected from a group comprising copper, nickel, silver and gold.

5. The optical arrangement according to claim 1, wherein all of the fastening studs comprise the same material.

6. The optical arrangement according to any claim 1, wherein the first plate and the component each have an electrical interconnection network, wherein the first fastening studs comprise metal and are connected to a respective one of the networks, and wherein the meltable material comprises an electric conductor.

7. The optical arrangement according to claim 1, wherein the at least one partly optical component comprises an optical filter.

8. The optical arrangement according to claim 1, wherein the optical component is mounted at a distance of between 10 and 100 microns away from the first plate.

9. The optical arrangement according to claim 1, wherein each plate comprises silicon.

10. The optical arrangement according to claim 1, further comprising a fibre engaged in at least one of the through-holes defining the optical input/output.

11. The optical arrangement according to claim 1, wherein at least one of the through-holes defining the optical input/output is filled with a material that is transparent to light signals.

\* \* \* \* \*